Patented Feb. 23, 1937

2,071,353

UNITED STATES PATENT OFFICE 2,071,353

COMPOSITIONS FOR FIREPROOFING

Willard L. Morgan, Nutley, N. J., assignor to Sylvania Industrial Corporation, Fredericksburg, Va., a corporation of Virginia No Drawing. Application July 13, 1935, Serial No. 31,229

9 Claims. (Cl. 134—78.6)

The invention relates in general to fireproofing and flame-proofing compositions, and in particular to the fireproofing of organic hydrophilic colloids, as well as to correlated improvements directed towards enhancing the physical characteristics and extending the usefulness of articles formed from such colloids.

Articles formed from organic colloidal materials swelling in water, i. e., hydrophilic colloids such, for example, as sheets and films of regenerated cellulose, are extensively used in the wrapping, packaging, textile and cordage arts, and also in window and stage decoration. These materials have a flammability at least equal to fibrous paper which restricts their use in certain installations, as theatrical stage sets and window decorations. To render such materials fireproof, the fireproofing agent must have the following requisites—(a) soluble in the organic hydrophilic colloidal material to such an extent as not to detract from the transparency of the material; (b) liquid at ordinary temperatures; and (c) relatively low vapor pressure. If possible, the fireproofing agent should be non-poisonous, non-odorous and light-stable.

It is a general object of the invention to provide fireproofing compositions which are soluble in a wide range of solvents, and which are liquids having relatively low vapor pressures.

It is another object of the invention to provide a fireproofing composition which is relatively soluble in water and adapted for incorporation in articles formed from organic hydrophilic colloidal material to such an extent as to render them fireproof but not to detract from their flexibility, transparency and strength.

A further object of the invention is to provide a composition for fireproofing articles formed from various materials so that the articles are not only non-flaming, but also non-flame-propagating.

In addition, the invention provides compositions of matter that are effective and economical fireproofing and flame proofing agents.

Other objects of the invention will in part be obvious and will in part appear hereinafter.

The invention accordingly comprises a novel fire-proofing agent for articles formed from various materials, more particularly organic, hydrophilic colloidal materials, possessing the features, properties and the relation of elements which will be exemplified in the composition hereinafter described and the scope of the invention will be indicated in the claims.

In accordance with the invention, articles formed from various materials, more particularly organic hydrophilic colloidal materials may be fire-proofed by combining them with a water soluble salt of an aliphatic organic nitrogen base with an acid of phosphorous. Such salts have the following probable general formula $$[P]-[O-NR]_n$$

in which P represents an oxygen-containing phosphorous acid residue, NR represents an alkyl substituted ammonium radical and "$n$" has a maximum value of 4 (as in pyrophosphoric acid which contains four replaceable hydrogens).

Similar salts may be prepared utilizing hydroxyl-containing bases, as the ethanolamines, and these may have the following probable general formula $$[P]-[O-NR']_n$$

in which P represents an oxygen-containing phosphorus acid residue, NR' represents a hydroxy-alkyl substituted ammonium radical, and "$n$" has a maximum value of 4.

Suitable organic nitrogen bases comprise aliphatic compounds derivable from ammonia such, for example, as primary, secondary and tertiary aliphatic amines, tetra alkyl ammonium hydroxides and alkyl and hydroxyl derivatives of these bases. The organic nitrogen bases may be used singly or in compatible admixtures in forming salts with the oxygen-containing acids of phosphorous, such as orthophosphoric acid ($H_3PO_4$, tribasic), pyrophosphoric acid ($H_4P_2O_7$, tetrabasic), metaphosphoric acid ($HPO_3$, monobasic), hypophosphoric acid ($H_2PO_3$, monobasic), phosphorous acid ($H_3PO_3$, dibasic), hypophosphorous acid ($H_3PO_2$, monobasic).

With the polybasic phosphorus acids one or more of the replaceable hydrogens may be substituted by the aliphatic organic nitrogen base. For example, taking ethanolamine as a suitable organic nitrogen base and ortho phosphoric acid as the phosphorus acid, there may be formed mono ethanolamine dihydrogen ortho phosphate, di-ethanolamine mono hydrogen ortho phosphate and tri-ethanolamine ortho phosphate. This entire series may be repeated with di-ethanolamine and again with tri-ethanolamine.

It has been found that the salts of the aliphatic organic nitrogen base with an acid of phosphorus are capable, when used in sufficient concentration, of rendering organic hydrophilic colloidal materials fireproofed. For example, a sheet of regenerated cellulose is immersed in a solution containing 20% di-(triethanolamine) mono hydrogen ortho phosphate

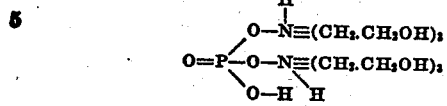

and the sheet dried. The treated sheet is fireproofed so that the material flames only as long as an externally-supplied flame is applied directly. When the external flame is removed, however, the flaming of the material ceases after a short period of time depending upon the concentration of the salt in the material. Compared with ordinary untreated fibrous paper, the treated material is also relatively non-flame-propagating.

It has now been found that the fireproofness of such articles may be further improved, so that the article is non-flaming and non-flame-propagating, by using in conjunction with the above mentioned salts a salt of ammonia with an inorganic acid selected from the group consisting of hydrobromic, hydriodic, selenic, sulphuric and phosphoric. For example, a sheet of regenerated cellulose may be soaked in an aqueous solution comprising 5% by weight of ammonium bromide and 10% by weight of propylamine meta phosphate

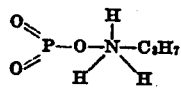

The treated sheet may be softened if desired and then dried. When a flame is brought into contact with the treated sheet, the material is destroyed by flameless combustion, but as soon as the flame is removed the combustion stops. The sheet material itself does not propagate the flame nor does the ash flow for any appreciable time.

It is to be understood that the salts of the aliphatic organic nitrogen bases with acids of phosphorus may be used singly or in a compatible mixture with one another, or combined in any suitable proportion with one or more of the ammonium salts above described. An ammonium salt may be present in the solution in an amount of from 3 to 10%. In general, it has been found sufficient to incorporate in the material from 10 to 20% by weight of the fireproofing agents herein described, although the upper limit is determined by the solubility of the fireproofing substance in the particular organic colloidal material to be treated, and the tackiness of the finished material, and the lower limit by the fireproofness desired.

The fireproofing agents of the present invention are adapted for treating a variety of materials, more particularly film-forming organic hydrophilic colloids, for example, gelatin, casein, and cellulose derivatives such as cellulose ethers, cellulose oxyethers and cellulose hydrate. The cellulose hydrate may be regenerated from viscose, cuprammonium cellulose, or from aqueous solutions of inorganic salts, such as zinc chloride; also from the de-esterification of cellulose esters, such as acetates and nitrates. The organic colloids may be treated while in the form of films, filaments, sheets, bands, hollow bodies and other articles fabricated in whole or in part from such colloids.

The fireproofing agents of the invention may be added to the original solutions of the colloids from which articles are to be formed, or the articles may be impregnated by contacting them with an aqueous solution of a fireproofing agent. The fireproofing agents of the present invention impart a high degree of fireproofness to organic hydrophilic colloids without detracting from the transparency, flexibility and strength thereof. The fireproofing agents are further characterized by being water soluble, odorless, tasteless, non-poisonous and non-crystallizing when incorporated in the colloid. Where the aliphatic organic nitrogen base contains hydroxyl groups therein, it has been found that the fireproofing agent also serves as a softening agent for the colloid, thus improving the flexibility of articles formed therefrom.

In the appended claims the expression "fireproof" is intended to designate that degree of non-inflammability at which the fireproofed material will not show a self-sustaining combustion when ignited and the external flame removed, and when the ambient atmosphere is at room temperature.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A fireproofing composition comprising a water soluble salt of an aliphatic organic nitrogen base with an acid of phosphorus.

2. A fireproofing composition comprising a water soluble salt of an alkyl amine with an acid of phosphorus.

3. A fireproofing composition comprising a water soluble salt of an ethanolamine with an acid of phosphorus.

4. A fireproofing composition comprising a water soluble salt having the following probable general formula

in which P represents an oxygen-containing phosphorus acid residue, NR is an alkyl substituted ammonium radical and "$n$" has a maximum value of 4.

5. A fireproofing composition comprising a water soluble salt having the following probable general formula

in which P represents an oxygen-containing phosphorus acid residue, NR' represents a hydroxyalkyl substituted ammonium radical and "$n$" has a maximum value of 4.

6. A fire and flame proofing composition comprising a water soluble salt of an aliphatic nitrogen base with an acid of phosphorus, and a salt of ammonia with an inorganic acid selected from the group consisting of hydrobromic, hydriodic, selenic, sulphuric, and phosphoric.

7. A fire and flame proofing composition comprising a water soluble alkyl amine phosphate and ammonium bromide.

8. A fire and flame proofing composition comprising a water soluble alkyl amine phosphate and tri-ammonium phosphate.

9. A fire and flame proofing composition comprising a water soluble alkyl amine phosphate and ammonium sulphate.

WILLARD L. MORGAN.